(12) United States Patent
Huang et al.

(10) Patent No.: US 10,429,899 B1
(45) Date of Patent: Oct. 1, 2019

(54) ELECTRONIC DEVICE

(71) Applicant: PEGATRON CORPORATION, Taipei (TW)

(72) Inventors: Chao-Kai Huang, Taipei (TW); Chang-Xin Ye, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/232,856

(22) Filed: Dec. 26, 2018

(30) Foreign Application Priority Data

Mar. 7, 2018 (TW) .............................. 107202998 U

(51) Int. Cl.
*G06F 1/16* (2006.01)

(52) U.S. Cl.
CPC ............ *G06F 1/166* (2013.01); *G06F 1/1616* (2013.01)

(58) Field of Classification Search
None
See application file for complete search history.

(56) References Cited

U.S. PATENT DOCUMENTS

| | | | | |
|---|---|---|---|---|
| 5,818,360 A * | 10/1998 | Chu | ...................... | G06F 1/1616 341/22 |
| 6,392,871 B1 * | 5/2002 | Yanase | .................... | G06F 1/162 345/905 |
| 6,392,877 B1 * | 5/2002 | Iredale | .................. | G06F 1/1616 248/551 |
| 6,430,038 B1 * | 8/2002 | Helot | ..................... | G06F 1/1616 248/917 |
| 6,612,668 B2 * | 9/2003 | Doan | .................... | G06F 1/1616 16/303 |
| 6,654,234 B2 * | 11/2003 | Landry | ................. | G06F 1/1616 248/917 |
| 6,816,365 B2 * | 11/2004 | Hill | ........................ | G06F 1/1616 341/22 |
| 6,873,521 B2 * | 3/2005 | Landry | ..................... | G06F 1/16 312/223.2 |
| 7,630,195 B2 * | 12/2009 | Lin | .......................... | G06F 1/203 361/679.26 |
| 8,520,382 B2 * | 8/2013 | Tye | ......................... | G06F 1/203 248/685 |

(Continued)

FOREIGN PATENT DOCUMENTS

| TW | M412391 | 9/2011 |
|---|---|---|
| TW | I518480 | 1/2016 |

*Primary Examiner* — Xanthia C Cunningham
(74) *Attorney, Agent, or Firm* — J.C. Patents

(57) ABSTRACT

An electronic device includes a first body, a second body, and a palm component. One end of the first body comprises a supporting portion. The second body is pivotally connected to a first side of the supporting portion and comprises a sliding portion. The palm component is pivotally connected to a second side of the supporting portion and comprises a guiding portion. The sliding portion is movably connected to the guiding portion. When the first body is pivotally rotated and expended relative to the second body, the second body is driven to make the sliding portion move along the guiding portion, and the second side of the supporting portion rotates relative to the first end of the supporting portion to make the palm component protrude from the second body. A tilt angle is formed between the second body and the protruding palm component.

7 Claims, 4 Drawing Sheets

(56) References Cited

U.S. PATENT DOCUMENTS

| | | | | |
|---|---|---|---|---|
| 8,542,486 | B2* | 9/2013 | Lin | G06F 1/203 |
| | | | | 174/547 |
| 8,792,231 | B2* | 7/2014 | Derryberry | H04M 1/0247 |
| | | | | 361/679.08 |
| 9,519,309 | B2 | 12/2016 | Okuley et al. | |
| 10,289,176 | B1* | 5/2019 | Chen | G06F 1/203 |
| 2011/0122555 | A1* | 5/2011 | Yeh | G06F 1/1616 |
| | | | | 361/679.01 |
| 2011/0194238 | A1* | 8/2011 | Song | G06F 1/1616 |
| | | | | 361/679.08 |
| 2013/0015310 | A1* | 1/2013 | Wu | F16M 11/10 |
| | | | | 248/346.06 |
| 2013/0069878 | A1* | 3/2013 | Li | G06F 1/1616 |
| | | | | 345/168 |
| 2013/0128442 | A1* | 5/2013 | Tseng | G06F 1/1616 |
| | | | | 361/679.09 |
| 2014/0375194 | A1* | 12/2014 | Arima | G06F 1/1616 |
| | | | | 312/322 |
| 2015/0192966 | A1* | 7/2015 | Kim | G06F 1/1681 |
| | | | | 361/679.28 |
| 2015/0212588 | A1 | 7/2015 | Fujioka | |
| 2016/0048176 | A1* | 2/2016 | Saito | G06F 1/1681 |
| | | | | 361/679.27 |
| 2016/0327994 | A1* | 11/2016 | Lee | G06F 1/1618 |
| 2017/0115703 | A1* | 4/2017 | Lim | G06F 1/1616 |

* cited by examiner

ELECTRONIC DEVICE

CROSS-REFERENCE TO RELATED APPLICATION

This application claims the priority benefit of Taiwan application serial no. 107202998, filed on Mar. 7, 2018. The entirety of the above-mentioned patent application is hereby incorporated by reference herein and made a part of this specification.

BACKGROUND OF THE DISCLOSURE

Field of the Disclosure

The disclosure relates to an electronic device, and more particularly to an electronic device that avoids contact of high temperature.

Description of Related Art

Current e-sports notebook has good visual effects and computing capability. When the game is running, the processor and graphics chip with high-performance also generate more heat, and the heat is transferred to the housing of the notebook such as the keyboard supporting area, and therefore the surface temperature of the keyboard supporting area is greatly increased. As a result, the user's hands feel uncomfortable when leaning against the keyboard supporting area. The existing solution is to arrange an additional plate on the keyboard supporting area to avoid that the user touches the keyboard supporting area with high temperature. However, the plate needs to be manually disassembled, and the plate further reduces the heat dissipation efficiency of the e-sports notebook, which is disadvantageous for the operation of e-sports notebook.

SUMMARY OF THE DISCLOSURE

The disclosure provides an electronic device that avoids contact of high temperature.

An electronic device of the disclosure includes a first body, a second body and a palm component. One end of the first body has a supporting portion. The second body is pivotally connected to a first side of the supporting portion and has a sliding portion. The palm component is pivotally connected to a second side of the supporting portion and comprises a guiding portion, and the sliding portion is slidably connected to the guiding portion. When the first body is pivotally rotated away from the second body, the second body is driven to make the sliding portion move along the guiding portion, and the second side of the supporting portion is rotated relative to the first side such that the palm component is protruded from the second body. A tilt angle is formed between the second body and the protruding palm component.

In an embodiment of the disclosure, the palm component includes a body and at least one linkage. Two opposite edges of the body comprise a sliding rail respectively to form the guiding portion. At least one linkage is disposed at the body and faces the first body, and is pivotally connected to the second side of the supporting portion.

In an embodiment of the disclosure, the sliding portion comprises a receiving groove and two sliders, the receiving groove is configured to receive the body, and the two sliders are slidably connected to the two sliding rails respectively.

In an embodiment of the disclosure, the second body comprises at least one engaging groove that communicates with the receiving groove and is configured to receive at least one linkage.

In an embodiment of the disclosure, the first body comprises a supporting surface disposed at the second side of the supporting portion. When the first body and the palm component are in an open state, the supporting surface, the body, and the at least one linkage are connected in a straight line.

In an embodiment of the disclosure, the supporting portion comprises a first blocking surface, and the second body comprises a first positioning surface. When the first blocking surface abuts against the first positioning surface, the first body and the palm component are in an open state with a tilt angle between 5 and 12 degrees.

In an embodiment of the disclosure, the supporting portion comprises a second blocking surface, and the second body comprises a second positioning surface. When the second blocking surface abuts against the second positioning surface, the first body and the palm component are in a closed state and the palm component is received within the sliding portion of the second body.

Based on the above, in the electronic device of the disclosure, when the first body is pivotally rotated away from the second body and the palm component with the maximum angle, the supporting portion of the first body may drive the sliding portion of the second body to move along the palm component simultaneously such that the body of the palm component is extended out of the sliding portion of the second body. The body of the palm component is configured to allow the user to rest his/her palm to avoid contacting the high-temperature second body of the electronic device. In addition, the second body is driven by the first body to have a tilt angle with respect to the palm component, which is advantageous for resting the palm or improving comfort in operation.

In order to make the aforementioned features and advantages of the disclosure more comprehensible, embodiments accompanying figures are described in detail below.

DESCRIPTION OF EMBODIMENTS

Figure 1A:
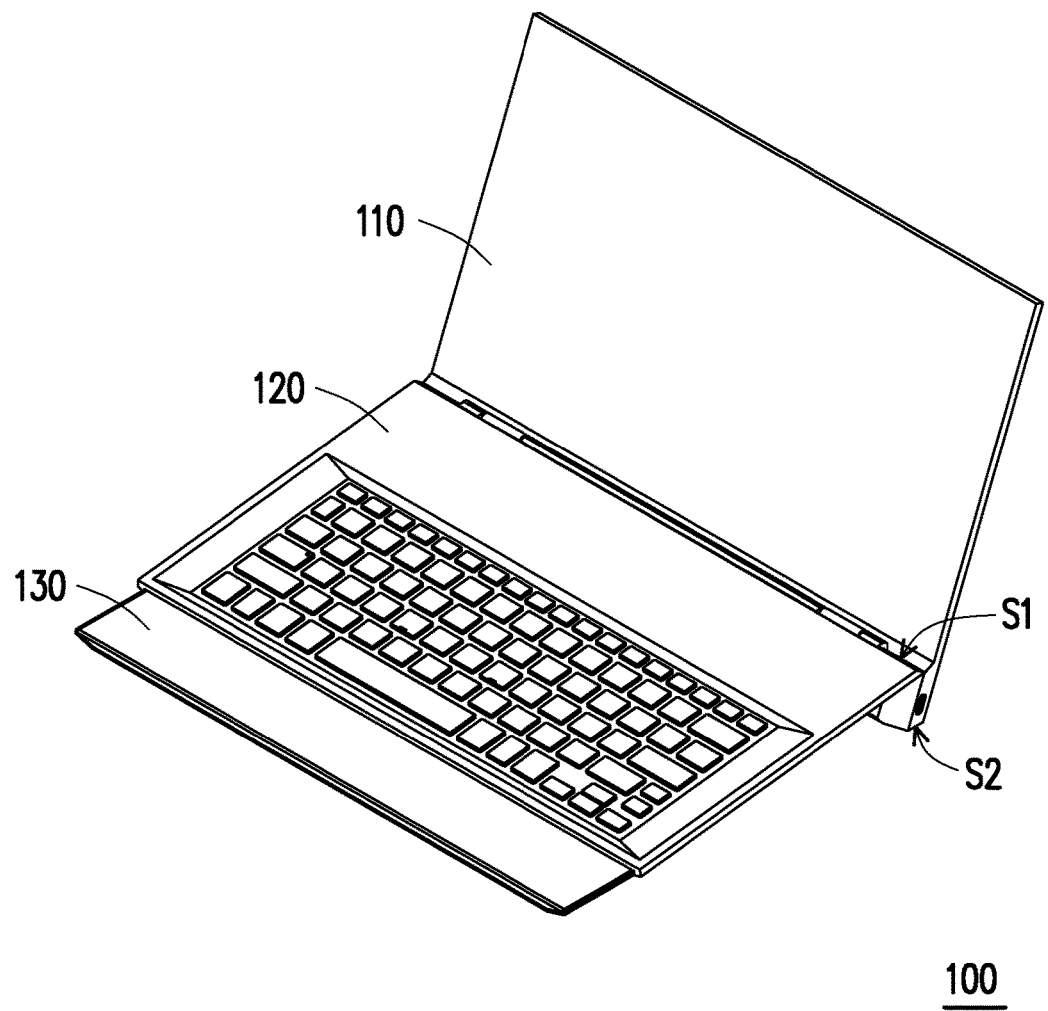
FIG. 1A is a stereoscopic diagram of an electronic device according to an embodiment of the disclosure.
Figure 1B:
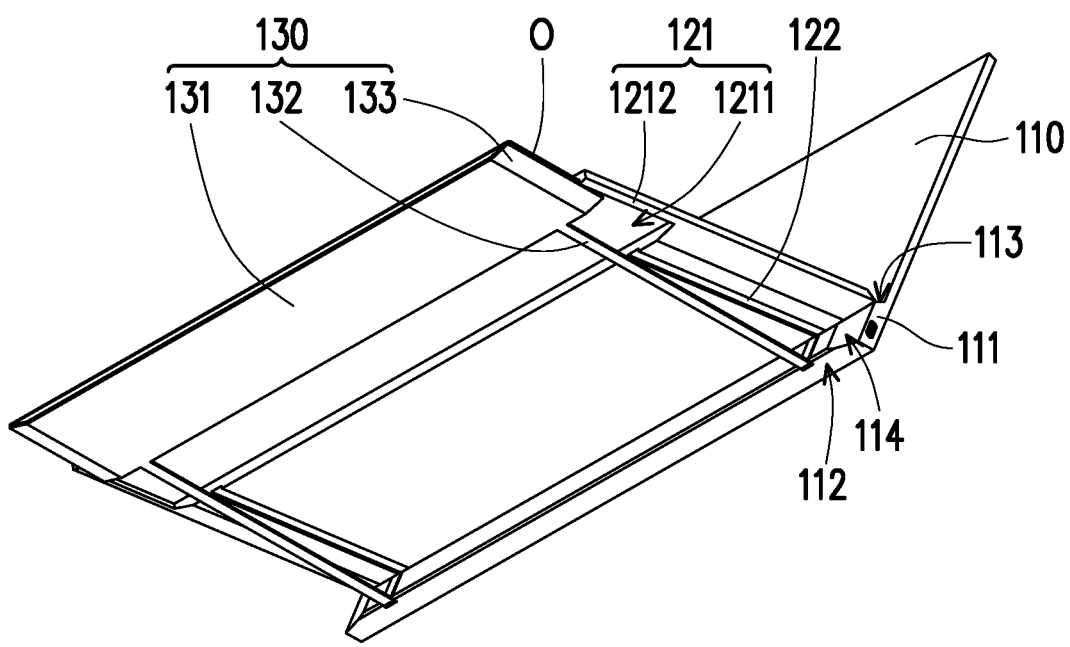
FIG. 1B is a stereoscopic diagram of the electronic device in FIG. 1A in another direction.
Figure 2A:
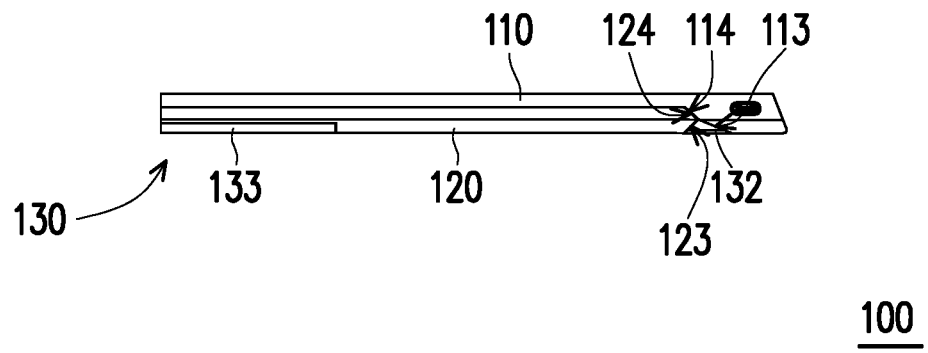
FIG. 2A to FIG. 2C are schematic views illustrating states change of the electronic device in FIG. 1A.
Figure 2B:
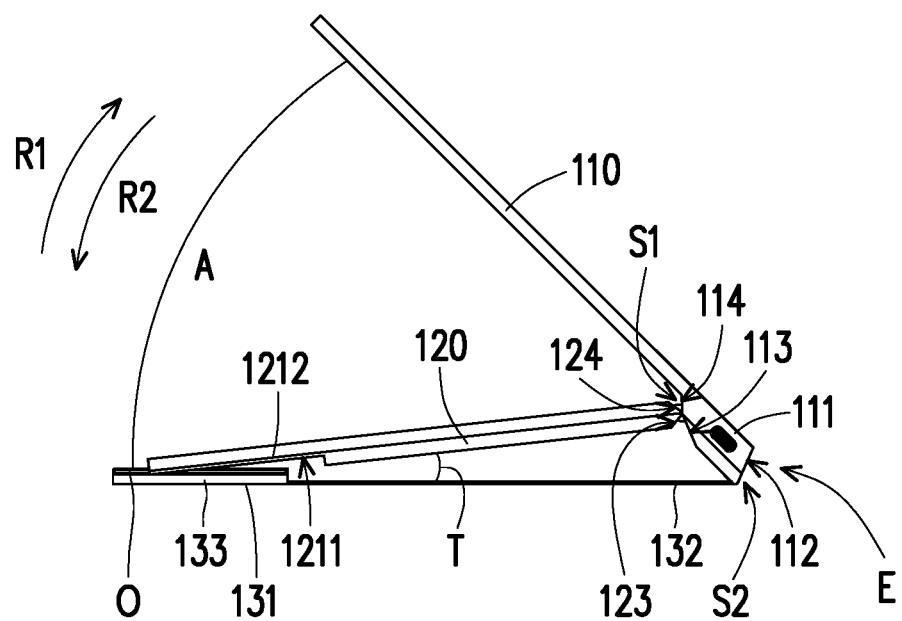
Figure 2C:
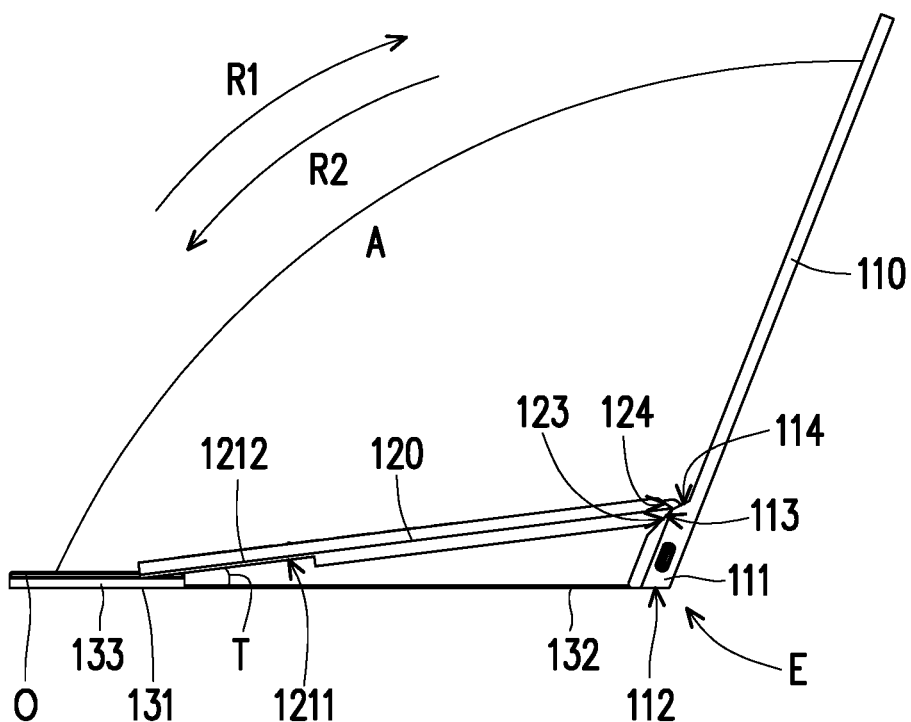

FIG. 1A is a stereoscopic diagram of an electronic device according to an embodiment of the disclosure. FIG. 1B is a stereoscopic diagram of the electronic device in FIG. 1A in another direction. FIG. 2A to FIG. 2C are schematic views illustrating states change of the electronic device in FIG. 1A.

Referring to FIG. 1A and FIG. 1B, an electronic device 100 of the disclosure is, for example, a notebook computer and includes a first body 110, a second body 120, and a palm component 130. In the exemplary embodiment, the first body 110 is, for example, a screen display for displaying a message of the notebook computer. The second body 120 is, for example, a loading host including a central processing unit (CPU), a memory, a south bridge chip, a north bridge chip, a graphic chip, and the like, and is coupled to an input device such as a keyboard for computing processing and input/output of the notebook computer. The palm component 130 is, for example, a plate structure and is made of a plastic material, a metal material, or other material.

Referring to FIG. 2A to FIG. 2C, one end E of the first body 110 has a supporting portion 111 that is disposed in a protruding manner. The second body 120 is pivotally connected to a first side S1 of the supporting portion 111 and has a sliding portion 121. The sliding portion 121 is located outside the supporting portion 111. The palm component 130 is pivotally connected to a second side S2 of the supporting portion 111 and has a guiding portion 133. In detail, the sliding portion 121 is slidably connected to the guiding portion 133. When the first body 110 is pivotally rotated away from the second body 120, the first side S1 of the supporting portion 111 is pivotally rotated relative to the second body 120, and the second body 120 is driven by the supporting portion 111 to make the sliding portion 121 move along the guiding portion 133 of the palm component 130. Finally, the palm component 130 is partially protruded from the sliding portion 121 of the second body 120, and the first side S1 of the supporting portion 111 lifts the palm component 130 upward during the pivoting process, so that a tilt angle A is formed between the second body 120 and the palm component 130.

The palm component 130 includes a body 131 and at least one linkage 132. The body 131 is a rectangular plate structure. In the exemplary embodiment, the number of the at least one linkage 132 is, for example, two. In other embodiments, the number of the at least one linkage 132 is, for example, one or two or more, and the disclosure is not limited thereto. The two linkages 132 are extended linearly from a side of the body 131 facing the first body 110 and are pivotally connected to the second side S2 of the supporting portion 111. Two opposite edges of the body 131 have sliding rails O respectively to constitute the guiding portion 133.

The sliding portion 121 of the second body 120 has a receiving groove 1211 and two sliders 1212. The receiving groove 1211 is disposed at a bottom surface of the second body 120 and configured to receive and cover the body 131 of the palm component 130. The two sliders 1212 are disposed at the bottom surface of the second body 120 and are slidably connected to the two sliding rails O on the body 131, respectively. Further, the second body 120 is moved relative to the palm component 130 by the sliding portion 121 to receive the palm component 130 in the receiving groove 1211 or to make the palm component 130 be protruded from the receiving groove 1211.

In the exemplary embodiment, the second body 120 has at least one engaging groove 122 disposed at the bottom surface of the second body 120 and communicating with the receiving groove 1211. When the electronic device 100 is in a closed state (see FIG. 2A), the at least one engaging groove 122 is configured to receive the at least one linkage 132. In the exemplary embodiment, the number of the at least one engaging groove 122 is, for example, two, to coordinate with the two linkages 132.

In the exemplary embodiment, the first body 110 has a supporting surface 112 disposed at the second side S2 of the supporting portion 111. When the first body 110 and the palm component 130 are in an open state (see FIG. 2C), the supporting surface 112, the body 131 and the two linkages 132 are connected in a straight line and are adapted to abut against a plane for placing the electronic device 100. In the exemplary embodiment, when the supporting surface 112, the body 131 and the two linkages 132 are connected in a straight line, the maximum angle A between the first body 110 and the palm component 130 is, for example, 120 degrees to switch into an optimal open state. In other embodiments, the maximum angle A between the first body 110 and the palm component 130 is, for example, greater than 120 degrees, but the disclosure is not limited thereto.

Referring to FIG. 1A, FIG. 1B, and FIG. 2B, in the exemplary embodiment, the supporting portion 111 of the first body 110 has a first blocking surface 113, and the second body 120 has a first positioning surface 123. When the first blocking surface 113 abuts against the first positioning surface 123, the first body 110 and the palm component 130 are in an open state (see FIG. 2C). The first blocking surface 113 is blocked by the first positioning surface 123 indicating that and the first body 110 and the palm component 130 have been opened to the maximum angle A. Further, the tilt angle T between the second body 120 and the palm component 130 is, for example, between 5 and 12 degrees, so as to be suitable for the user to rest his/her palm and to improve the comfort in operating the keyboard, a touchpad or other related input device on the second body 120. In the exemplary embodiment, the tilt angle T is, for example, 7.5 degrees, but the disclosure is not limited thereto.

In the exemplary embodiment, the supporting portion 111 of the first body 110 has a second blocking surface 114, and the second body 120 has a second positioning surface 124. When the second blocking surface 114 abuts against the second positioning surface 124, the first body 110 and the palm component 130 are in a closed state. The second positioning surface 124 blocks the second blocking surface 114 indicating that the first body 110 and the palm component 130 have been closed to the minimum angle A, and the body 131 of the palm component 130 is received in the receiving groove 1211 of the sliding portion 121.

The process flow of switching the electronic device 100 from the closed state into the open state is described below. Referring to FIG. 2A to FIG. 2C and FIG. 1B, when the electronic device 100 is in the closed state, the first body 110 leans against the second body 120, and the angle A between the first body 110 and the second body 120 is 0 degree. Further, the second blocking surface 114 abuts against the second positioning surface 124, and the first blocking surface 113 is spaced apart from the first positioning surface 123. In addition, the second body 120 leans against the palm component 130, in which the body 131 of the palm component 130 is disposed in the receiving groove 1211 of the sliding portion 121, and the two linkages 132 are disposed in the two engaging grooves 122 respectively.

Referring to FIG. 2B, when the first body 110 is subjected to a force to rotate in a first direction R1, the first side S1 of the supporting portion 111 of the first body 110 starts to be pivotally rotated relative to the second body 120, and the second blocking surface 114 gradually moves away from the second positioning surface 124. In the meantime, the supporting portion 111 is rotated around the pivotal portion of the second side S2 and the two linkages 132, so that the first side S1 of the supporting portion 111 drives the second body 120 to rotate in a second direction R2 opposite to the first direction R1, and makes the second body 120 gradually lift from the palm component 130. In addition, the first side S1 of the supporting portion 111 also drives the second body 120 to move linearly with respect to the palm component 130.

Referring to FIG. 2C, the force is continuously applied to the first body 110 until the first blocking surface 113 abuts against the first positioning surface 123, so that the supporting surface 112, the body 131 and the two linkages 132 are connected in a straight line, and a maximum angle A is formed between the first body 110 and the palm component 130. Meanwhile, the sliding portion 121 of the second body 120 moves to a certain point along the guiding portion 133 of the palm component 130, and the body 131 of the palm component 130 is protruded from the sliding portion 121. Meanwhile, a maximum tilt angle T is formed between the second body 120 and the palm component 130, thereby switching the electronic device 100 into the open state.

Further, the process that the electronic device 100 is switched from the open state into the closed state is opposite to the foregoing process flow, and related details are not incorporated below.

In summary, in the electronic device of the disclosure, when the first body is pivotally rotated away from the second body and the palm component with the maximum angle, the supporting portion of the first body may drive the sliding portion of the second body to move along the palm component simultaneously such that the body of the palm component is protruded out of the sliding portion of the second body. The body of the palm component is configured to allow the user to rest his/her palm to avoid contacting the high-temperature second body of the electronic device. In addition, the second body is driven by the first body to have a tilt angle with respect to the protruded palm component, which is advantageous for resting the palm or improving comfort in operation.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electronic device, comprising:
a first body, one end of the first body comprising a supporting portion;
a second body, pivotally connected to a first side of the supporting portion and the second body comprising a sliding portion; and
a palm component, pivotally connected to a second side of the supporting portion and comprising a guiding portion, and the sliding portion slidably connected to the guiding portion,
wherein when the first body is pivotally rotated away from the second body, the second body is driven to make the sliding portion move along the guiding portion, and the second side of the supporting portion is rotated relative to the first side such that the palm component is protruded from the second body, a tilt angle is formed between the second body and the protruding palm component.

2. The electronic device according to claim 1, wherein the palm component comprises a body and at least one linkage, two opposite edges of the body comprise a sliding rail respectively to constitute the guiding portion, the at least one linkage is disposed at the body and faces the first body, and is pivotally connected to the second side of the supporting portion.

3. The electronic device according to claim 2, wherein the sliding portion comprises a receiving groove and two sliders, the receiving groove is configured to receive the body, and the two sliders are slidably connected to the two sliding rails respectively.

4. The electronic device according to claim 2, wherein the second body comprises at least one engaging groove communicating with the receiving groove and configured to receive the at least one linkage.

5. The electronic device according to claim 2, wherein the first body comprises a supporting surface disposed at the second side of the supporting portion, when the first body and the palm component are in an open state, the supporting surface, the body and the at least one linkage are connected in a straight line.

6. The electronic device according to claim 1, wherein the supporting portion comprises a first blocking surface, and the second body comprises a first positioning surface, when the first blocking surface abuts against the first positioning surface, the first body and the palm component are in an open state, and the tilt angle between the second body and the palm component is between 5 and 12 degrees.

7. The electronic device according to claim 1, wherein the supporting portion comprises a second blocking surface, and the second body comprises a second positioning surface, when the second blocking surface abuts against the second positioning surface, the first body and the palm component are in a closed state, and the palm component is received in the sliding portion of the second body.

\* \* \* \* \*